US006441583B1

United States Patent
Perelle

(10) Patent No.: US 6,441,583 B1
(45) Date of Patent: Aug. 27, 2002

(54) METHOD, ARRANGEMENT AND INTERFACE SYSTEM TO ENABLE ELECTRICAL BATTERIES OF DIFFERENT KINDS TO BE CHARGED BY MEANS OF THE SAME CHARGER DEVICE

(75) Inventor: Michel Perelle, Parcay-Meslay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/982,860

(22) Filed: Oct. 22, 2001

(30) Foreign Application Priority Data

Oct. 23, 2000 (FR) .............................................. 00 13512

(51) Int. Cl.⁷ ................................................ H02J 7/00
(52) U.S. Cl. ...................................... 320/119; 320/116
(58) Field of Search ............................... 320/119, 116, 320/106, 118, 122, 136, 160, 162; 324/434

(56) References Cited

U.S. PATENT DOCUMENTS

| 5,645,949 A | 7/1997 | Young | 429/7 |
| 5,677,613 A | 10/1997 | Perelle | 320/122 |
| 5,773,957 A | 6/1998 | Imaseki | 320/116 |
| 5,910,723 A | * 6/1999 | Perelle | 320/119 |
| 6,072,300 A | * 6/2000 | Tsuji | 320/116 |
| 6,078,165 A | * 6/2000 | Ashtiani et al. | 320/116 |

* cited by examiner

Primary Examiner—Bao Q. Vu
Assistant Examiner—Lawrence Luk
(74) Attorney, Agent, or Firm—Sughrue Mion, PLLC

(57) ABSTRACT

A method enabling balanced charging of batteries that have voltages of the same order of magnitude and which can be of different kinds uses a charger device to provide at least one constant regulation voltage appropriate to a battery, in an arrangement including a system composed of individual interfaces associated with respective rechargeable cells constituting the battery and a common interface. The individual interfaces provide the common interface with an indication relating to the voltages that they measure at the terminals of the associated cell. The common interface produces a signal controlling switching of a battery charging characteristic between two characteristics when one of the measurement circuits determining the voltage present at the terminals of the rechargeable cells reports that a maximum balancing threshold value is exceeded.

8 Claims, 1 Drawing Sheet

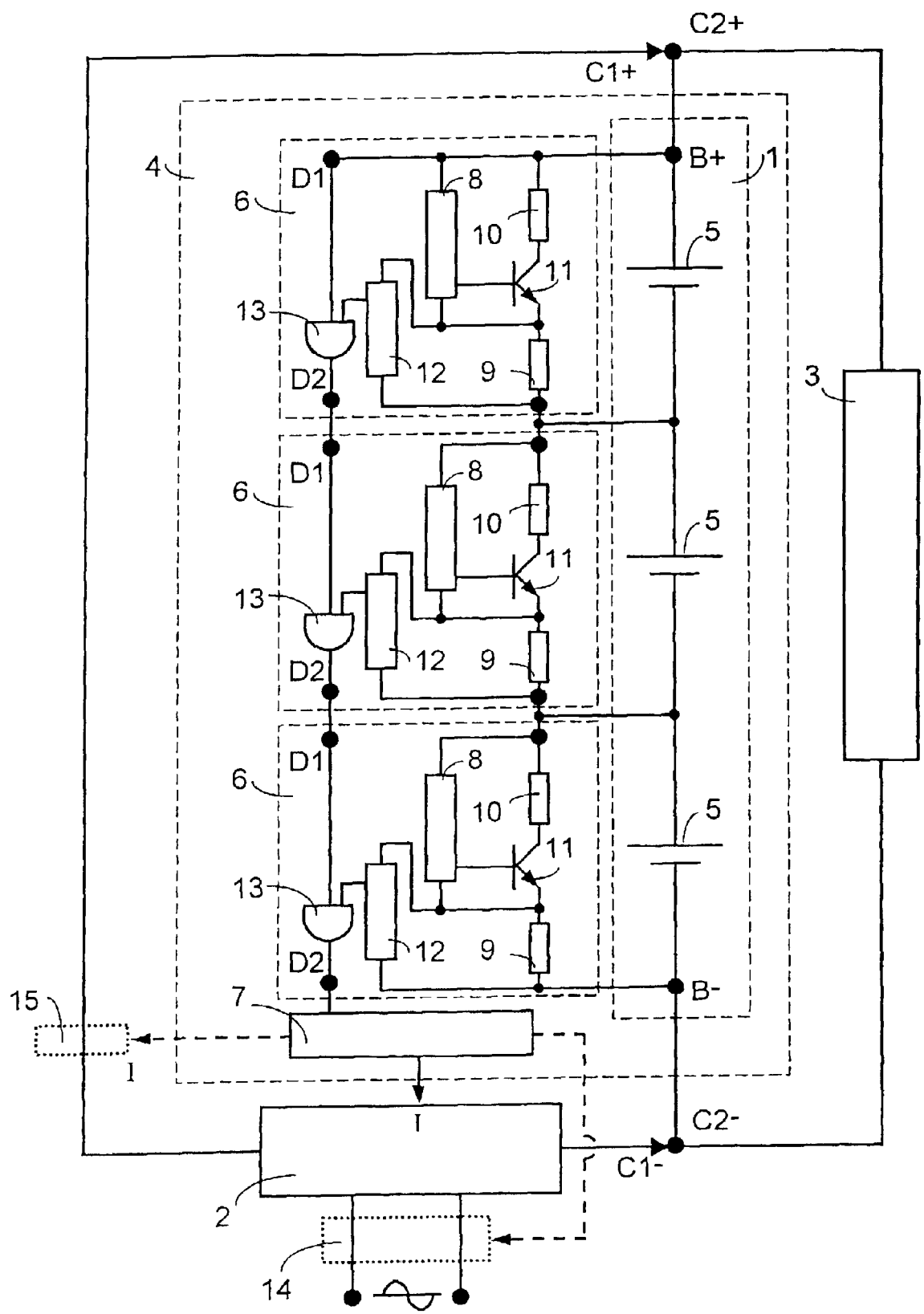
Single figure

METHOD, ARRANGEMENT AND INTERFACE SYSTEM TO ENABLE ELECTRICAL BATTERIES OF DIFFERENT KINDS TO BE CHARGED BY MEANS OF THE SAME CHARGER DEVICE

CROSS REFERENCE TO RELATED APPLICATIONS

This application is based on French Patent Application No. 00 13 512 filed Oct. 23, 2000, the disclosure of which is hereby incorporated by reference thereto in its entirety, and the priority of which is hereby claimed under 35 U.S.C. §119.

BACKGROUND OF THE INVENTION

1. Field of the Invention

The invention relates to a method, an arrangement and interface system for charging electrical batteries that supply voltages of the same order and which are composed of rechargeable cells which can be of different kinds from one battery to another. It uses a charger device able to supply at least one constant regulation voltage suitable for a battery. It aims to protect the cells of a battery against overvoltages likely to occur during charging.

The arrangement envisaged is of the type which temporarily substitutes a battery for another power supply to power a load circuit if that other supply is temporarily unable to do so. The previously charged battery remains on permanent "floating" charge, for example, if the other supply is operating. This kind of arrangement routinely combines a battery, a device for charging the battery from a supply, and a load circuit, all of which are permanently interconnected. This configuration is used with telecommunication equipment that is intended to operate without interruption, for example.

The arrangement can also be organized differently, so that the battery, which can power a load circuit, can be charged intermittently from a supply via a charger device. The latter can top up the charge, using the technique referred to above, when the supply is operating. This is the case, for example, if the battery is that of an arrangement including a charger device that is powered by a supply rendered active on demand and/or as and when required, as in an electric vehicle. Descrirtion of the prior art Arrangements of the above kind are routinely equipped with means for balancing the various rechargeable cells that constitute a battery, for optimum management over time. Such means are disclosed by European patent 121 547, among others.

There are many devices for charging a battery which supply a predetermined regulation voltage. There are also many devices providing the facility to select one or more of a number of regulation voltages, in particular for charging different batteries.

Because of the standardization of rechargeable batteries and non-rechargeable dry cells, it is often possible to power the same equipment, by supplying it with a sufficient voltage for it to operate, by means of a battery, that is to say a particular system of cells of the same kind, rechargeable or not, chosen from a range of systems, as a function of the requirements of the user and/or what is available in terms of batteries at the time in question. The battery cells that can be substituted for each other are lead-acid cells, alkaline cells and lithium cells, for example.

However, to be really advantageous, this substitution facility implies that users can charge at least some of the different kinds of batteries using the same device, rather than using individual devices each suitable for a different battery. The necessity to have different charger devices has undoubted drawbacks for users wishing to be able to use batteries of different kinds, in place of each other, as a function of what they require or what is available at the time, to power the same load circuit in the context of a particular arrangement.

The skilled person knows that the overvoltages likely to occur during charging can have a harmful effect on the battery cells subjected to them, especially if the cells are more sensitive to overvoltages than other kinds of cell, as is the case with lithium cells, for example.

It is therefore necessary to take precautions if it is intended to charge a battery using a device designed for another battery, based on the fact that the battery has substantially the same nominal voltage.

The skilled person knows that a voltage step-up/step-down unit can be added to the electrical circuit connecting a charger device to a battery if the latter is supervised by a management circuit which transmits a control signal to the voltage step-up/step-down unit to modify the voltage supplied to the battery. The unit reduces the voltage when a battery cell is overcharged. However, this kind of additional component is costly and may be a problem if no space is provided for it on the battery or the charger device.

The skilled person also knows that a charger device, for example an individual charger of the usual kind for lead-acid batteries, can be used to charge batteries of a different kind if it is possible to modify the regulation voltage supplied by the device to prevent all risk of overvoltage at each of the cells of the battery being charged.

There are charger devices designed to receive an analog regulation voltage control signal. However, this kind of charger device can be used only with a battery to be charged which is associated with an interface providing an appropriate analog control signal. This kind of interface has drawbacks that correspond to those of an additional voltage step-up/step-down unit and requires a power supply to meet its requirements.

In some arrangements in which a battery is used in association with a charger device, there is also provided a circuit connected in parallel with each rechargeable cell to divert at least some of the current that is supplied to the battery by the charger device and which flows in that cell if the voltage measured at the terminals of the cell by an associated measuring circuit exceeds a particular threshold value.

An arrangement of this kind is specifically disclosed in European patent 121 547, referred to above. Its components can be physically associated in modular form with the rechargeable battery cell to which they are assigned, or possibly a group of such cells, in an autonomous hardware unit. This kind of unit can be connected in series with at least one other identical autonomous unit to form a battery in which balancing is ensured cell by cell.

SUMMARY OF THE INVENTION

The invention proposes a method of charging an electrical battery by means of a charger device able to supply at least one appropriate constant regulation voltage to the battery to be charged, regardless of the nature of the rechargeable cells constituting the battery, provided that the battery has a nominal voltage compatible with the regulation voltage or voltages that the charger device supplies, the method including the following steps:

continuously measuring the voltage at terminals of each rechargeable cell of the battery;

activating an associated individual shunt circuit connected in parallel with each rechargeable cell as soon as the voltage measured at the terminals of the rechargeable cell exceeds a particular regulation minimum threshold value fixed as a function of the nature of the rechargeable cell and for as long as the measured voltage is above the minimum threshold value;

supplying an indication as to whether a balancing maximum threshold value fixed as a function of the nature of a rechargeable cell is exceeded or not by the voltage measured at the terminals of the rechargeable cell;

translating into the form of a single binary signal respective indications as to whether the maximum threshold is exceeded or not obtained for each of the rechargeable cells at a given time, the single signal being maintained at a first binary value for as long as none of the voltages measured at the terminals of the rechargeable cells of the battery exceeds the maximum threshold value and at a second value otherwise; and translating the single signal obtained from the indications as to whether the maximum threshold is exceeded or not into a signal controlling switching of a battery charging characteristic between two characteristics that can be selected either directly at the charger device or via an auxiliary device associated therewith.

The invention also proposes an arrangement including a battery made up of rechargeable cells connected in series and a charger device able to provide at least one constant regulation voltage for charging the battery, which is associated with:

an individual interface for each rechargeable cell of the battery, including a first voltage measuring circuit connected to terminals of the rechargeable cell concerned to control a current shunt circuit connected in parallel with it in order to shunt at least some of the charging current that is supplied to it if the voltage measured at the terminals of the rechargeable cell exceeds a particular regulation minimum threshold value fixed as a function of the nature of the cell, the individual battery interfaces each including a second voltage measuring circuit for determining if a balancing maximum , threshold value is exceeded at the terminals of the associated rechargeable cell to which the individual interface is assigned, on the basis of a voltage measured across a measuring resistor in series with the shunt device of the interface between the terminals of the associated rechargeable cell, and a circuit constituting a transmission AND logic gate which transmits a binary indication as to whether the balancing maximum threshold value is exceeded or not at the terminals of the associated rechargeable cell;

a common interface to which the individual interfaces are connected and to which each supplies at least one indication of the measured voltage for the associated rechargeable cell, the indication being used to control charging by the charger device, the common interface translating any indication relating to the balancing maximum threshold value being exceeded supplied to it by means of a transmission chain into which the transmission gates of the individual interfaces are inserted in series in the form of a charge characteristic switching control signal; and a charger device which has at least one battery charge characteristic which is modified either in the charger device itself or in an associated-auxiliary device as a function of the characteristic switching control signal.

The invention further proposes an interface system for a battery made up of rechargeable cells, which system includes:

an individual interface for each rechargeable battery cell, each individual interface including a voltage measuring circuit connected to terminals of one of the rechargeable cells to control a current shunt circuit connected in parallel with the cell in order to shunt at least some of the charging current applied to it if the voltage measured at the terminals of the cell exceeds a particular regulation minimum threshold value fixed as a function of the nature of the cell, the individual battery interfaces each including a second voltage measuring circuit for determining if a balancing maximum threshold value is exceeded at the terminals of the associated rechargeable cell, to which the individual interface is assigned, on the basis of a voltage measured across a measuring resistor in series with the shunt device of the interface between the terminals of the associated rechargeable cell, and a circuit constituting a transmission logic AND gate which transmits a binary indication as to whether the balancing maximum threshold value is exceeded or not at the terminals of the associated rechargeable cell; and a common interface to which the individual interfaces are connected for each to supply at least one indication relating to the voltage measured for the associated rechargeable cell, the indications being used by a charger device to control charging, the common interface translating any indication relating to the balancing maximum threshold value being exceeded, supplied to it by means of a transmission chain into which the transmission gates of the individual interfaces are inserted in series, in the form of a charge characteristic switching control signal for use by a charger device either directly or via an associated auxiliary device.

The invention, its features and its advantages are explained in the following description, which is given with reference to the single figure of the accompanying drawing.

BRIEF DESCRIPTION OF THE DRAWING

The single figure of the accompanying drawing is a circuit diagram of one example of an arrangement in accordance with the invention.

DETAILED DESCRIPTION OF THE PREFERRED EMBODIMENT

The arrangement includes an electric battery 1, a device 2 for charging the battery from a supply, not shown, and a load circuit 3 that is powered by the battery and can be connected to the supply or not.

The battery is of modular design and constitutes a system combining a series of modules connected in series, each module consisting of at least one rechargeable cell 5. To simplify the description, the remainder of the application refers only to rechargeable cells, on the understanding that the invention can be used with rechargeable cells grouped into modules, as indicated above.

The battery 1 shown has two end terminals B+ and B− between which three rechargeable cells 5 are connected in series.

The charger device 2 is supplied with electrical power from a supply, not shown, for example an electrical power distribution network or an independent electrical power generator. The charger device 2 is connected to the end terminals of a battery to be charged via connection members C1+ and C1−.

In the embodiment shown, the load circuit 3 which the battery 1 powers is connected to the battery via connection members C2+ and C2−.

The connection members referred to above can be of types known to the skilled person and are therefore not described in detail here. The load circuit 3 is a functional equipment unit of an independent device or system, for example.

The arrangement envisaged can charge the battery 1 by means of the charger device 2 whilst also powering the load circuit 3, if required and if the charger device and the power supply circuit are connected simultaneously to the end terminals of the battery.

As indicated in the preamble, the use of different batteries is envisaged, depending on the requirements of the user or the availability in terms of batteries at the time, using a charger device and in particular in the context of an arrangement according to the invention. The charger device provides at least one particular charging characteristic. That characteristic corresponds to a particular regulation voltage, for example. The batteries have respective nominal voltages appropriate to the voltage or voltages, in particular the regulation voltage or voltages, that the charger device can supply.

For example, substituting a 48 volt battery made up of lithium cells for a battery made up of lead-acid cells or alkaline cells can be envisaged, and is one situation in which the numbers of cells in the two batteries is not the same.

In this case, each rechargeable lithium cell 5 of the battery is shunted by a shunt circuit. If the voltage measured at the terminals of a rechargeable cell rises above a particular balancing minimum threshold value V1, each shunt circuit shunts at least some of the current supplied to the battery by the charger device 2 and which flows in that cell. The threshold value is fixed as a function of the nature of the rechargeable cells.

In a preferred embodiment, the shunt circuit of each rechargeable cell 5 of a battery is incorporated into an individual interface 6 associated with the cell. The individual interfaces are connected in common to a common interface 7, for example by a daisychain connection, as shown in the figure.

Each individual interface 6 further includes means for implementing the method according to the invention in cooperation with the common interface 7.

The shunt circuit of each individual interface operates in accordance with the principle described in European patent 121 547, referred to above, for example, as succinctly explained below. A first voltage measuring circuit 8 is connected to the terminals of the rechargeable cell 5 via a measuring resistor 9 connected to the negative terminal of the cell.

The measuring circuit 8 of an individual interface 6 is of the kind described in the European patent cited above; it therefore controls the connection into circuit of a shunt branch consisting of a resistor 10 and a transistor 11, here connected in series with the measuring resistor 9, between the terminals of the rechargeable cell 5 with which the interface is associated. The skilled person knows that no current flows through the shunt branch if the voltage v evaluated by the measuring circuit 8 has not reached a value v1 for which the voltage at the terminals of the rechargeable cell 5 is equal to the minimum threshold value V1. As soon as the value v1 is exceeded, the measuring circuit commands the transistor 11 to divert into the shunt branch some of the current supplied to the rechargeable cell by the charger device. The shunted current increases progressively if the image voltage v evaluated by the measuring circuit 8 reflects a progressive increase in the voltage at the terminals of the rechargeable cell 5.

According to the invention, each individual interface 6 includes a second voltage measuring circuit 12 which supplies the common interface 7 with a binary indication relating to the voltage at the terminals of the rechargeable cell 5 of the battery 1 it is monitoring. That indication is preferably a binary 0 if the voltage at the terminals of the cell 5 exceeds a particular balancing maximum threshold value V2 greater than the minimum threshold value V1. The maximum threshold voltage V2 is chosen to be less than or at most equal to the maximum voltage Vm permitted at the terminals of one of the rechargeable cells that constitute the battery 1, the voltages V2 and Vm being fixed as a function of the nature of the cells that constitute the battery. In a preferred embodiment, non-exceeding and exceeding of the threshold respectively correspond to a binary 1 signal and a binary 0 signal. The indication supplied by a measuring circuit 12 is transmitted from the individual interface 6 which includes the circuit to the common interface 7 via a circuit that constitutes a transmission gate 13 and has a logic AND function.

Each transmission gate 13 has a first input at which it receives the indication supplied by the measuring circuit 12 of the individual interface that includes it and a second input referred to as a chaining input. The chaining input of a transmission gate of an individual interface is connected to the output of the transmission gate that precedes it in the chain, the chaining input of the interface at the head of the chain systematically receiving a binary 1 signal. Consequently, the transmission gate 13 of the head individual interface must produce a binary 1 signal at its output if no indication of a threshold being exceeded is received from the measuring circuit 12 to which it is connected, because in this case both of its inputs receive a binary 1 signal. Likewise for the transmission gates 13 of the subsequent individual interfaces of the chain, if no indication of a threshold being exceeded is supplied by the respective measuring circuits 12 of those interfaces, a binary 1 signal is supplied to the common interface 7. In practice this signal is reflected in the flow of a current along the chain connecting the individual interfaces to the common interface.

In the embodiment shown by way of example, the positive potential at the positive terminal B+ of the battery 1 is therefore applied to the chaining input of the transmission gate 13 of the individual interface 6 at the head of the chain. The chain is obtained by series connection of the individual interfaces 6 which each have a chain input terminal D1 and a chain output terminal D2 between which the transmission gate 13 of the interface is connected. The indication by a measuring circuit 12 that a balancing maximum threshold value V2 is exceeded at the terminals of a cell 5 corresponds to the appearance of a binary 0 signal at the first input of the transmission gate 13 controlled by that measurement circuit and therefore at the output of that transmission gate. The current previously flowing through the chain connecting the individual interfaces to the common interfaces is then interrupted. This solution also enables action on the charger device if the continuity of the chain is broken, in the same manner as if the balancing maximum threshold voltage V2 is exceeded.

The common interface 7 is designed to act through the intermediary of a charge characteristic switching signal on a switching function incorporated in or associated with the charger device 2 to which it is connected. In a first embodiment, intended for charger devices designed to provide a single constant regulation voltage during battery charging, this function ensures switching between a first position in which the charging current that the charge device produces is applied to the battery if the binary signal received by the common interface is a binary 1 signal, and a second position in which the current is no longer supplied if the binary signal received by the common interface is a binary 0 signal.

The resulting on/off operation can occur in the charger device, which then includes appropriate switching means adapted to be controlled via a control input 1, through the intermediary of which the usual means, not shown here, are actuated as a function of the value of the binary signal received by the common interface.

This operation can also be obtained by acting on a switch unit 14 external to the charger device. For example, the switch unit is inserted between the charger device and a power distribution network which powers the charger device, and is then used to control the supply of power to the charger device on an on/off basis. It can be incorporated into the common interface 7. This kind of switch unit 15 can also be provided at the output of the charger device, with the same aim of controlling the power supplied to the battery to charge it, the unit being controlled by the common interface 7, under the same conditions as the switch unit 14 envisaged above.

A battery 1 is charged by the charger device 2 defined above if the voltage at the terminals of each of the rechargeable cells 5 constituting the battery is below the maximum threshold value V2 that is fixed at exactly the same value by the individual interfaces for each rechargeable cell. Each rechargeable cell 5 receives the current supplied at constant voltage by the charger device if that current is present and is not at least partly shunted by the shunt circuit associated with that cell.

The shunt circuit of any rechargeable battery cell at whose terminals the measured voltage exceeds the minimum threshold value V1 continues to operate. It partially discharges the rechargeable cell, and this discharge can continue until the voltage measured at the terminals of that rechargeable cell falls below the minimum threshold value V1.

The battery is therefore balanced by discharging the most heavily charged cells. As soon as the voltages measured at the terminals of the cells of the battery 1 are all below the maximum threshold value V2, the serial transmission chain between the individual interfaces is reestablished and is used to control the charger device via the common interface 7 so that it again supplies a charging current to the battery, to which it applies the constant regulation voltage previously applied.

The charging of a battery is reflected in a succession of phases of charging its cells interleaved with phases during which the battery is slightly discharged because of the consumption of energy by the load circuit that it powers and/or the operation of the shunt circuits associated with the cells of the battery. Each cell of the battery is therefore balanced by being charged during phases in which the charger is rendered active and by being discharged during phases in which the charger is rendered inactive. If balancing is done well, operation of a load circuit at a constant "floating" voltage can be obtained when the battery is charged. This "floating" operation can be obtained permanently in the context of an arrangement in which the charger device is in service and connected to a battery and a load device permanently. It can also be obtained during phases in which the charger device is in service and connected at least to the battery, in the context of an arrangement in which the charger device is activated only intermittently.

In a second embodiment, the charger device 1 provides two constant regulation voltages Vr1 and Vr2 rather than only one, in particular at the end of charging. The two voltages can usually be obtained by means provided as standard in the charger device, and the control input 1 is then used to control the means, not shown, for switching from one voltage to the other.

Once again the batteries, of different kinds, are associated with individual interfaces 6 and with a common interface 7 for charging them by means of a charger device 2. As previously, as long as the voltage measured at the terminals of each of the cells of a battery remains below the minimum threshold value V1, the transmission gates 13 of the individual interfaces 6 transmit a binary 1 signal to the common interface 7. In contrast, if the voltage measured at the terminals of a rechargeable battery cell exceeds the maximum threshold value V2, the transmission chain is interrupted and a binary 0 signal appears at the common interface.

The change from 1 to 0 of the binary signal input to the common interface is used to control the substitution of the higher regulation voltage Vr2 obtained from the charger device 2 for charging the battery for the lower regulation voltage Vr1, in particular at the end of charging. The change from 0 to 1 of the binary signal applied to the common interface via the serial transmission chain is used to control switching in the reverse direction from the voltage Vr1 to the lower voltage Vr2.

Under these conditions a battery is charged by a succession of charging phases during which the battery is subjected to the higher regulation voltage Vr2, as long as the voltages measured at the terminals of the cells of the battery are below the minimum threshold value V1. Those phases are interleaved with phases in which the battery is subjected to a lower regulation voltage Vr1 as soon as and for as long as the voltage measured at the terminals of a rechargeable cell exceeds the maximum threshold value V2. As already envisaged previously, depending on the choice made in terms of the battery/charger device/load circuit arrangement, the charger device 2 can be included in a power supply which can power the load circuit in parallel, if required.

Also, the supply of charging current to the battery is generally stopped in the second embodiment described above from the moment at which the voltage measured at the terminals of a battery rechargeable cell (or failing this of the battery) exceeds a limit value, greater than the maximum threshold voltage, beyond which overvoltages that could damage the battery cells are likely to occur.

Balancing is effected under conditions similar to those referred to above if the rechargeable cells of the battery are in good condition. The charger device 2 can then operate continuously, when it is connected to the battery. Successive switching from one regulation voltage to the other is then effected under the control of the measuring circuits assigned to the rechargeable cells that constitute the battery.

There is claimed:

1. A method of charging an electrical battery by means of a charger device able to supply at least one appropriate constant regulation voltage to the battery to be charged, regardless of the nature of the rechargeable cells constituting said battery, provided that said battery has a nominal voltage compatible with said regulation voltage or voltages that said charger device supplies, said method including the following steps:

continuously measuring the voltage at terminals of each rechargeable cell of said battery;

activating an associated individual shunt circuit connected in parallel with each rechargeable cell as soon as the voltage measured at said terminals of said rechargeable cell exceeds a particular regulation minimum threshold value fixed as a function of the nature of said rechargeable cell and for as long as said measured voltage is above said minimum threshold value;

supplying an indication as to whether a balancing maximum threshold value fixed as a function of the nature of a rechargeable cell is exceeded or not by said voltage measured at said terminals of said rechargeable cell;

translating into the form of a single binary signal respective indications as to whether said maximum threshold is exceeded or not obtained for each of said rechargeable cells at a given time, said single signal being maintained at a first binary value for as long as none of said voltages measured at said terminals of said rechargeable cells of said battery exceeds said maximum threshold value and at a second value otherwise; and translating said single signal obtained from said indications as to whether said maximum threshold is exceeded or not into a signal controlling switching of a battery charging characteristic between two characteristics that can be selected either directly at the charger device or via an auxiliary device associated therewith.

2. The method claimed in claim 1 wherein said charge characteristic switching control signal operates on a power switching function of said charger device or included in an auxiliary device disposed between said charger device and its power supply to enable the supply of charging current to said battery if said respective voltages measured at said terminals of said rechargeable cells are below said balancing maximum threshold value and to stop the supply of charging current to said battery as soon as the voltage measured at the terminals of one of said rechargeable battery cells exceeds said maximum threshold value.

3. The method claimed in claim 1 wherein said charge characteristic switching control signal controls the substitution of one charge regulation voltage for another in said charger device to control switching from the higher to the lower of said two regulation voltages if said voltage measured at said terminals of a rechargeable battery cell exceeds said balancing maximum threshold value and to switch from said lower to said higher regulation voltage if said respective voltages measured at said terminals of said rechargeable cells are below said balancing maximum threshold value.

4. An arrangement including a battery made up of rechargeable cells connected in series and a charger device able to provide at least one constant regulation voltage for charging said battery, which is associated with:

an individual interface for each rechargeable cell of said battery, including a first voltage measuring circuit connected to terminals of the rechargeable cell concerned to control a current shunt circuit connected in parallel with it in order to shunt at least some of the charging current that is supplied to it if said voltage measured at said terminals of said rechargeable cell exceeds a particular regulation minimum threshold value fixed as a function of the nature of said cell, said individual battery interfaces each including a second voltage measuring circuit for determining if a balancing maximum threshold value is exceeded at said terminals of the associated rechargeable cell to which said individual interface is assigned, on the basis of a voltage measured across a measuring resistor in series with said shunt device of said interface between said terminals of said associated rechargeable cell, and a circuit constituting a transmission AND logic gate which transmits a binary indication as to whether said balancing maximum threshold value is exceeded or not at said terminals of said associated rechargeable cell;

a common interface to which said individual interfaces are connected and to which each supplies at least one indication of said measured voltage for the associated rechargeable cell, said indication being used to control charging by said charger device, said common interface translating any indication relating to said balancing maximum threshold value being exceeded supplied to it by means of a transmission chain into which said transmission gates of said individual interfaces are inserted in series in the form of a charge characteristic switching control signal; and a charger device which has at least one battery charge characteristic which is modified either in said charger device itself or in an associated auxiliary device as a function of said characteristic switching control signal.

5. The arrangement claimed in claim 4 wherein said signal indicating that a threshold value is exceeded which is supplied to said common interface via said serial transmission chain has a binary value of 1 if respective indications as to whether said threshold is exceeded or not supplied by said transmission gates of said individual interfaces reflect the fact that said voltages at said terminals of said cells of said battery by said measuring circuits of said individual interfaces are below said balancing maximum threshold value fixed for said cells constituting said battery.

6. The arrangement claimed in claim 4 wherein modifying said charge characteristic as a function of said switching control signal cuts off said charge current supplied by said charger device to said battery if an individual interface determines that the voltage at said terminals of a battery cell is above said balancing maximum threshold value fixed for each cell of said battery, said charging current being supplied if it is determined that no voltage at said terminals of a cell exceeds said threshold value.

7. The arrangement claimed in claim 4 wherein modifying the charge characteristic as a function of said switching control signal changes from one value to the other of said regulation voltage produced by said charger at the end of charging a battery, a change from said higher value to said lower value being effected if an individual interface determines that a voltage at said terminals of a battery cell exceeds said balancing maximum threshold value fixed for each cell of said battery, and the reverse change being effected if it is determined that no voltage at said terminals of one of said cells exceeds said threshold value.

8. An interface system for a battery made up of rechargeable cells, which system includes:

an individual interface for each rechargeable battery cell, each individual interface including a voltage measuring circuit connected to terminals of one of said rechargeable cells to control a current shunt circuit connected in parallel with said cell in order to shunt at least some of the charging current applied to it if the voltage measured at said terminals of said cell exceeds a particular regulation minimum threshold value fixed as a function of the nature of said cell, said individual battery interfaces each including a second voltage measuring circuit for determining if a balancing maximum threshold value is exceeded at said terminals of the associated rechargeable cell, to which said individual interface is assigned, on the basis of a voltage measured across a measuring resistor in series with said shunt device of said interface between said terminals of said associated rechargeable cell, and a circuit constituting a transmission logic AND gate which transmits a binary indication as to whether said balancing maximum threshold value is exceeded or not at said terminals of said associated rechargeable cell; and a common interface to which said individual interfaces are connected for each to supply at least one indication relating to the voltage measured for said associated rechargeable cell, said indications being used by a charger device to control charging, said common interface translating any indication relating to said balancing maximum threshold value being exceeded, supplied to it by means of a transmission chain into which said transmission gates of said individual interfaces are inserted in series, in the form of a charge characteristic switching control signal for use by a charger device either directly or via an associated auxiliary device.

* * * * *